United States Patent
Mahajan et al.

(10) Patent No.: US 10,244,467 B2
(45) Date of Patent: Mar. 26, 2019

(54) POWER-SAVE OPERATIONS FOR ACCESS POINTS

(71) Applicant: MediaTek Singapore Pte. Ltd., Singapore (SG)

(72) Inventors: Rahul Mahajan, New Delhi (IN); Tarun Kumar Datta, Greater Noida (IN); Vishal Bhargava, Noida (IN); Abhijeet Singh Katiyar, Farrukhabad (IN); Abhijit Uplenchwar, Noida (IN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 37 days.

(21) Appl. No.: 15/605,950

(22) Filed: May 26, 2017

(65) Prior Publication Data
US 2017/0265131 A1    Sep. 14, 2017

(51) Int. Cl.
*H04W 52/02* (2009.01)
*H04L 5/00* (2006.01)
*H04W 84/12* (2009.01)

(52) U.S. Cl.
CPC ....... *H04W 52/0206* (2013.01); *H04L 5/0053* (2013.01); *H04L 5/0055* (2013.01); *H04W 84/12* (2013.01); *Y02D 70/142* (2018.01); *Y02D 70/26* (2018.01)

(58) Field of Classification Search
CPC .................................................. H04W 84/12
See application file for complete search history.

(56) References Cited

U.S. PATENT DOCUMENTS

| 2013/0114488 A1* | 5/2013 | Fang ................. H04W 52/0206 370/311 |
| 2014/0321349 A1 | 10/2014 | Seok et al. |
| 2015/0163742 A1* | 6/2015 | Kwon ............... H04W 52/0235 370/311 |
| 2017/0041869 A1 | 2/2017 | Homchaudhuri et al. |

FOREIGN PATENT DOCUMENTS

TW    201542016 A    11/2015

OTHER PUBLICATIONS

Taiwan Intellectual Property Office, Office Action for Taiwan Patent Application No. 107102296, dated Dec. 7, 2018.

\* cited by examiner

*Primary Examiner* — Kouroush Mohebbi
(74) *Attorney, Agent, or Firm* — Han IP PLLC; Andy M. Han (57) ABSTRACT

A method and an apparatus pertaining to power-save operations for the apparatus may involve a processor of the apparatus transmitting, via a transmitter of the apparatus, a power-save request to one or more communication devices associated with the apparatus. The processor may receive, via a receiver of the apparatus, an acknowledgment from each of the one or more communication devices. The processor may cause the apparatus to enter a power-save mode in response to receiving the acknowledgment from each of the one or more communication devices.

17 Claims, 6 Drawing Sheets

POWER-SAVE OPERATIONS FOR ACCESS POINTS

TECHNICAL FIELD

The present disclosure is generally related to wireless communications and, more particularly, to power-save operations for access points (APs) as well as software-enabled APs and virtual routers.

BACKGROUND

Unless otherwise indicated herein, approaches described in this section are not prior art to the claims listed below and are not admitted to be prior art by inclusion in this section.

Presently there is no definition in the Institute of Electrical and Electronics Engineers (IEEE) 802.11 specifications for power-save operations for APs and soft APs. Specifically, presently there is no mechanism defined in IEEE 802.11 for an AP or software-enabled AP to notify its associated stations regarding absence due to power saving.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a novel scheme for an AP/software-enabled AP to notify its absence (due to being in the power-save mode) to its associated stations in the basic service set (BSS) and enter a power-save mode. Advantageously, the proposed scheme ensures two-way communication between an AP and its associated stations for power-save confirmation and allowing the AP to enter the power-save mode. Moreover, under the proposed scheme, there is no likelihood of transmission of data frames by associated stations, which would lead to throughput degradation, during the absence of the AP while it is in the power-save mode. Furthermore, under the proposed scheme, stations associated with an AP in the power-save mode may buffer data frames destined for the AP.

In one aspect, a method may involve a processor of an apparatus transmitting, via a transmitter of the apparatus, a power-save request to one or more communication devices associated with the apparatus. The method may also involve the processor receiving, via a receiver of the apparatus, an acknowledgment from each of the one or more communication devices. The method may further involve the processor causing the apparatus to enter a power-save mode responsive to receiving the acknowledgment from each of the one or more communication devices.

In another aspect, a method may involve a processor of a communication device receiving, via a receiver of the communication device, a power-save request from an apparatus. The method may also involve the processor transmitting, via a transmitter of the communication device, an acknowledgment to the apparatus. The method may further involve the processor buffering one or more frames destined for the apparatus after the transmitting.

In yet another aspect, an apparatus may include a memory and a processor. The memory may store one or more sets of instructions. The processor may be communicatively coupled to the memory to execute the one or more sets of instructions such that, upon execution of the one or more sets of instructions, the processor performs acts including: generating a power-save request for transmission to one or more communication devices; receiving an acknowledgment from each of the one or more communication devices; and responsive to receiving the acknowledgment from each of the one or more communication devices, causing the apparatus to enter a power-save mode.

It is noteworthy that, although description of the proposed scheme and various examples is provided below in the context of wireless communications in accordance with the IEEE 802.11 specification, the proposed scheme and any variation(s)/derivative(s) thereof may be implemented in communications in accordance with other protocols, standards and specifications where implementation is suitable. Thus, the scope of the proposed scheme is not limited to the description provided herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

The IEEE 802.11 specification reserves a power management-related bit (hereinafter interchangeably referred as the "power-save bit" or "PS bit") of the frame control field in 802.11 wireless local area network (WLAN) media access control (MAC) header in data frames transmitted by an AP. The proposed scheme of the present disclosure utilizes this reserved PS bit in the frame control field of the WLAN MAC header for an AP or a software-enabled AP (hereinafter interchangeably referred as "soft AP") to communicate its intent to enter a power-save mode to its associated stations (STAs). This ensures two-way communication between the AP/soft AP and its associated STAs for confirmation regarding entering power-save mode and, thus, provides the AP/soft AP the opportunity to reduce its power consumption by entering the power-save mode from time to time. Moreover, according to the proposed scheme, as the AP/soft AP would enter the power-save mode after it has received positive acknowledgment from all of its associated STAs (at least those that are active), the STAs would not transmit frames to the AP/soft AP to result in throughput degradation when the AP/soft AP is in the power-save mode.

Figure 1:
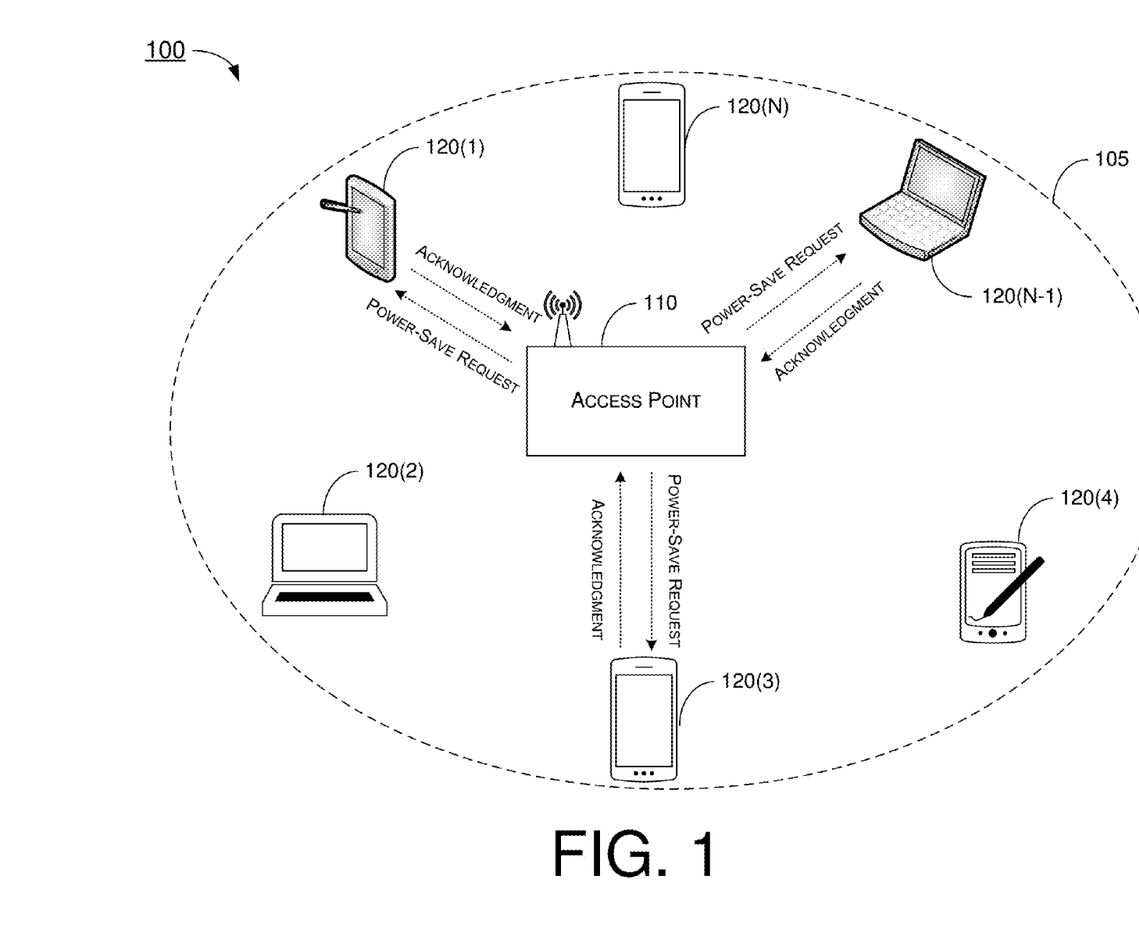
FIG. 1 is a diagram of an example scenario in accordance with an implementation of the present disclosure.

FIG. 1 illustrates an example scenario 100 in accordance with an implementation of the present disclosure. Referring to FIG. 1, in scenario 100 an access point 110, or AP 110, and a number of associated STAs 120(1)-120(N), with N being a positive integer, may form a basic service set (BSS) 105. That is, each of STAs 120(1)-120(N) may be actively engaged in wireless communications (e.g., receiving and transmitting data) with AP 110 in accordance with the IEEE 802.11 specification at any given point in time. AP 110 may be an access point, a software-enabled access point, or a virtual router. Each of STAs 120(1)-120(N) may be a communication device capable of communicating with AP 110 in accordance with the IEEE 802.11 specification.

One or more of the STAs 120(1)-120(N) may remain active (e.g., staying "awake" or in a normal mode) while one or more others may enter a power-save or sleep mode (e.g., as such STA(s) may have no data to transmit to AP 110) to minimize power consumption. Thus, AP 110 may be able to determine whether each of STAs 120(1)-120(N) is active or inactive (e.g., in a power-save or sleep mode) in accordance with the IEEE 802.11 specification. In the example shown in FIG. 1, STAs 120(1), 120(3) and 120(N-1) are active while STAs 120(2), 120(4) and 120(N) are inactive at the given point in time. In other words, AP 110 may identify STAs 120(1), 120(3) and 120(N-1) as a subset of STAs 120(1)-120(N) as active stations, with each of STAs 120(1), 120(3) and 120(N-1) actively engaged in communications with AP 110, while STAs 120(2), 120(4) and 120(N) are not actively engaged in communications with AP 110 (e.g., as each of STAs 120(2), 120(4) and 120(N) may be in a power-save or sleep mode).

Under the proposed scheme, as AP 110 determines that it will enter a power-save mode (e.g., a sleep mode), AP 110 transmits a power-save request to some or all of the STAs 120(1)-120(N) (e.g., at least the active ones such as STAs 120(1), 120(3) and 120(N-1)). For instance, AP 110 may broadcast or multicast the power-save request with a quality-of-service (QoS) or non-QoS data or null frame. Specifically, AP 110 may set a power management-related bit, or the PS bit, in a frame control field of a MAC header of each of one or more data frames or null frames to a value (e.g., from binary 0 to binary 1) to indicate an intent to enter the power-save mode. In some implementations, AP 110 may first transmit (e.g., broadcast) a delivery traffic indication map (DTIM) beacon and then transmit (e.g., broadcast or multicast) the one or more data frames or null frames after transmitting the DTIM beacon.

After transmitting the power-save request, AP 110 may receive an acknowledgment from each of the active STAs 120(1), 120(3) and 120(N-1). Upon receiving the acknowledgment from each of the active STAs 120(1), 120(3) and 120(N-1), AP 110 may enter the power-save mode (e.g., from a normal mode or another operational mode). In some implementations, the acknowledgment received from each of the one or more communication devices may include a null frame or a data frame, with a power management-related bit, or the PS bit, in a frame control field of a MAC header of the null frame or the data frame set to a value (e.g., from binary 0 to binary 1) that indicates a positive acknowledgement of the power-save request.

Accordingly, under the proposed scheme, the reserved PS bit is utilized as a way or mechanism for AP 110 to communicate to STAs 120(1)-120(N) the intent of AP 110 entering the power-save mode, as well as a way or mechanism for each of STAs 120(1)-120(N) to communicate to AP 110 whether or not the STA acknowledges and agrees that AP 110 enters the power-save mode. For instance, when there is no intent for AP 110 to enter the power-save mode, the PS bit may be set at or reset to the default value of binary 0. Conversely, when AP 110 intends to enter the power-save mode, the PS bit may be set to binary 1. Correspondingly, when a STA positively acknowledges and agrees with the intent of AP 110 entering the power-save mode, the PS bit may be set to binary 1. Conversely, when a STA has data to transmit to AP 110, the STA may transmit the data to AP 110 without acknowledging the power-save request until the STA has no more data to transmit to AP 110, at which time the STA may acknowledge the power-save request at the end of the data transmission by setting the PS bit to binary 1 in a null frame or data frame transmitted to AP 110. For example, the PS bit in each but the last data frame transmitted to AP 110 may be set to binary 0 while the PS bit of the last data frame may be set to binary 1.

In the example shown in FIG. 1, in an event that AP 110 does not receive an acknowledgment from at least one of STAs 120(1), 120(3) and 120(N-1), AP 110 may delay its entering the power-save mode until an acknowledgement is received from each of STAs 120(1), 120(3) and 120(N-1) in response to a subsequent power-save request to be transmitted by AP 110. When in the power-save mode, AP 110 may exit the power-save mode prior to transmitting a next DTIM beacon, which is consecutively subsequent a previous DTIM beacon transmitted by AP 110 before AP 110 entered the power-save mode.

In some implementations, after transmitting the acknowledgment to AP 110, each of STAs 120(1), 120(3) and 120(N-1) may buffer one or more frames destined for AP 110, if any. For instance, in buffering the one or more frames, each of STAs 120(1), 120(3) and 120(N-1) may buffer the one or more frames until a DTIM beacon is received from AP 110, which is consecutively subsequent a previous DTIM beacon which is received from AP 110 prior to the buffering. Thus, the duration for buffering is less than the duration between the times of transmission of two consecutive DTIM beacons.

Figure 2:
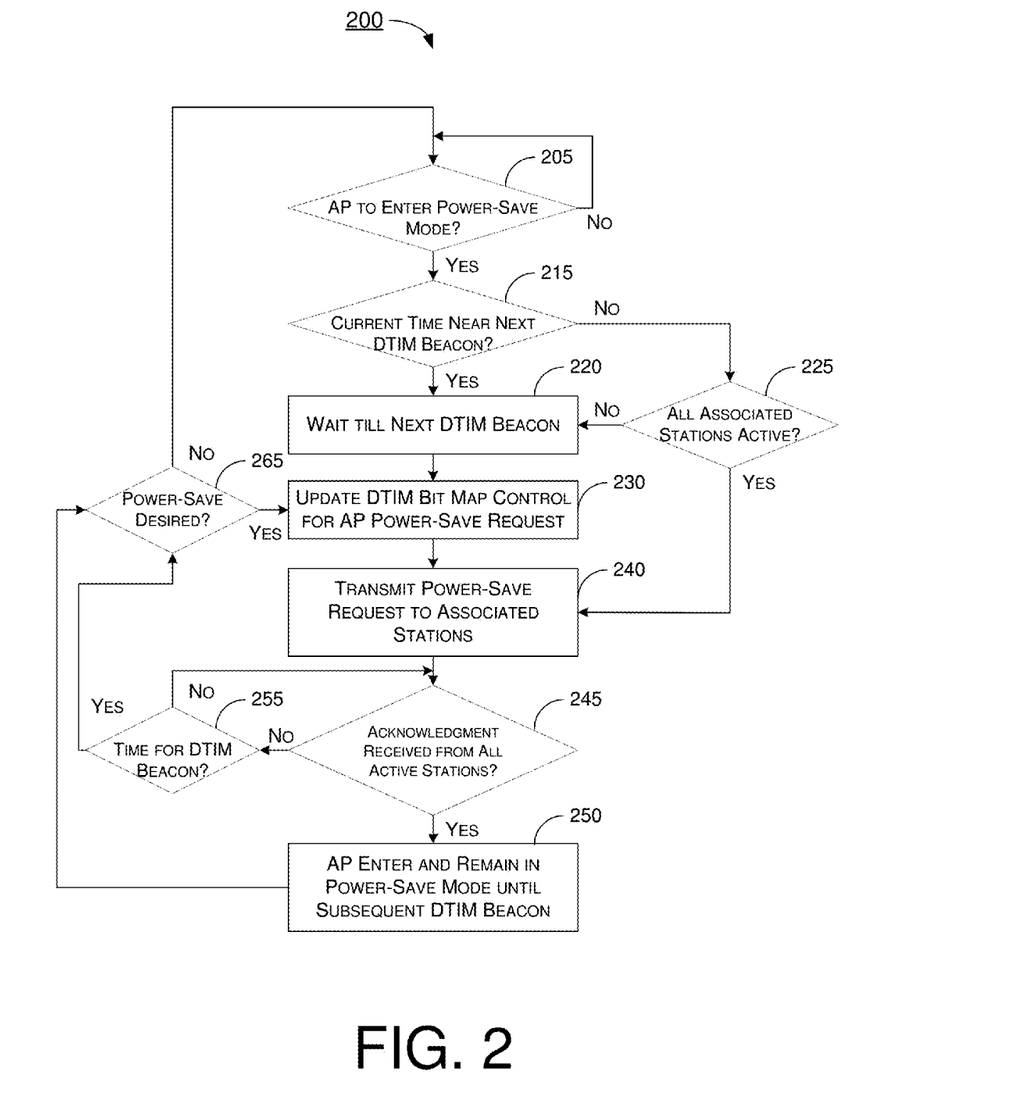
FIG. 2 is a diagram of an example logic flow in accordance with an implementation of the present disclosure.

FIG. 2 illustrates an example logic flow 200 in accordance with an implementation of the present disclosure. Logic flow 200 may include one or more operations, actions, or functions as represented by one or more of blocks 205, 215, 220, 225, 230 240, 245, 250, 255 and 265. Although illustrated as discrete blocks, various blocks of logic flow 200 may be divided into additional blocks, combined into fewer blocks, or eliminated, depending on the desired implementation. Logic flow 200 may be implemented AP 110 in scenario 100 described above as well as apparatus 400 described below. Solely for illustrative purposes and without limiting the scope, description of logic flow 200 is provided below in the context of AP 110 in scenario 100, although logic flow 200 may be implemented in different scenarios and by different APs, soft APs and virtual routers. Logic flow 200 may begin at 210.

At 210, AP 110 may determine whether or not it should enter the power-save mode to minimize its power consumption (e.g., when there is no outgoing data to be transmitted to any of the STAs 120(1)-120(N)). In an event that AP 110 determines that it is not to enter the power-save mode, logic flow 200 may return to 210. Otherwise, in an event that AP 110 determines that it should enter the power-save mode, logic flow 200 may proceed from 210 to 215.

At 215, AP 110 may determine whether or not the current point in time is near a time for transmitting a next DTIM beacon. In an event that it is determined that the current time is near the time for transmission of the next DTIM beacon, logic flow 200 may proceed from 215 to 220. In an event that it is determined that the current time is not near the time for transmission of the next DTIM beacon, logic flow 200 may proceed from 215 to 225.

At 220, AP 110 may delay the entering of the power-save mode and wait till the transmission of the next DTIM beacon. Logic flow 200 may proceed from 220 to 230.

At 225, AP 110 may determine whether or not all of the stations associated with AP 110, namely STAs 120(1)-120(N), are active. In an event that it is determined that all of the stations associated with AP 110 are active, logic flow 200 may proceed from 225 to 240. In an event that it is determined that not all of the stations associated with AP 110, logic flow 200 may proceed from 225 to 220.

At 230, AP 110 may update DTIM bit map control for power-save request. For instance, AP 110 may set the value to binary 1 for the PS bit in the frame control field of the MAC header of a QoS or non-QoS data frame to be transmitted (e.g., broadcast or multicast) after the next DTIM beacon. Logic flow 200 may proceed from 230 to 240.

At 240, AP 110 may transmit the power-save request to its associated stations, at least to the active ones such as STAs 120(1), 120(3) and 120(N-1). For instance, AP 110 may first broadcast the next DTIM beacon and then broadcast or multicast the power-save request. Logic flow 200 may proceed from 240 to 245.

At 245, AP 110 may determine whether or not an acknowledgement is received from all active stations among all the stations associated with AP 110 (e.g., from each of the active STAs 120(1), 120(3) and 120(N-1), as AP 110 does not expect to receive acknowledgment or data from the inactive STAs 120(2), 120(4) and 120(N)). In an event that an acknowledgment is received from each of the active STAs 120(1), 120(3) and 120(N-1), logic flow 200 may proceed from 245 to 250. In an event that an acknowledgment is not received from each of the active STAs 120(1), 120(3) and 120(N-1), logic flow 200 may proceed from 245 to 255.

At 250, AP 110 may enter the power-save mode and remain in the power-save mode until the time for transmission of the immediately subsequent DTIM beacon. For instance, when in the power-save mode, at least some of the components of AP 110 may be inactive or otherwise deactivated, or may operate at a lower frequency and/or a lower voltage, to minimize overall power consumption by AP 110. Logic flow 200 may proceed from 250 to 265.

At 255, AP 110 may determine whether or not it is time for transmission of a DTIM beacon (e.g., one that is consecutively subsequent to a previous DTIM beacon). In an event that it is determined that it is time for transmission of a DTIM beacon, logic flow 200 may proceed from 255 to 265. Otherwise, logic flow 200 may proceed from 255 to 245.

At 265, AP 110 may determine whether or not it is desirable to enter the power-save mode (e.g., in view of outgoing queue of data at the time of determination). In an event that it is determined that power-save mode is desired, logic flow 200 may proceed from 265 to 230. Otherwise, logic flow 200 may proceed from 265 to 205.

Accordingly, logic flow 200 may be executed by AP 110 when AP 110 is in operation. Pursuant to logic flow 200, AP 110 may maximize its sleep time till the time for transmission of a next DTIM beacon, and AP 110 can decide or otherwise determine again whether to enter the power-save mode after transmitting the DTIM beacon. In an event that not all active stations acknowledge the power-save request, AP 110 may defer its power saving and try again after the transmission of the next DTIM beacon. Advantageously, this may allow AP 110 to maximize its power saving or, put differently, minimize its power consumption without degradation in throughput.

Figure 3:
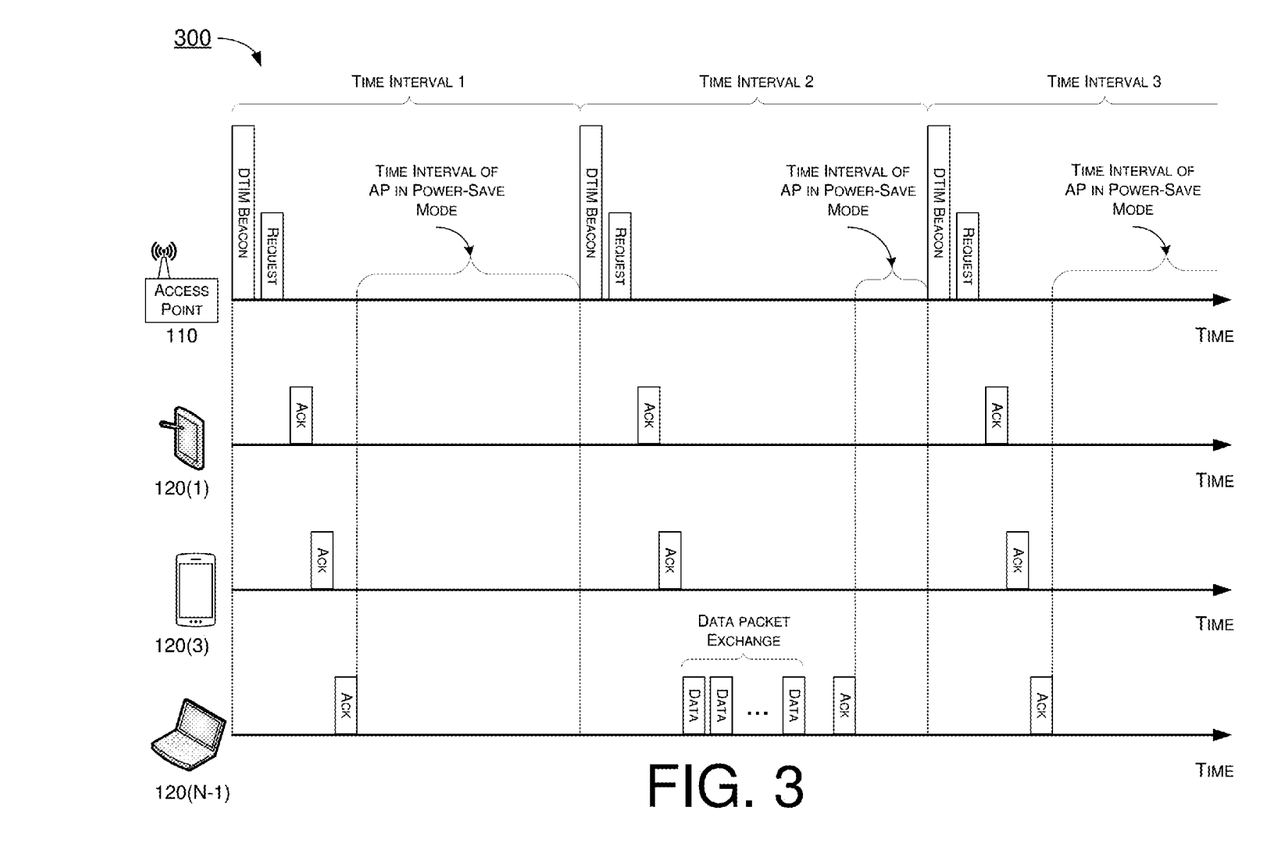
FIG. 3 is a diagram of an example scenario in accordance with another implementation of the present disclosure.

FIG. 3 illustrates an example scenario 300 in accordance with another implementation of the present disclosure. Scenario 300 may be an example depiction of a temporal aspect of scenario 100. Referring to FIG. 3, scenario 300 shows communications between AP 110 and those active stations associated with AP 100, namely STAs 120(1), 120(3) and 120(N-1), over a given period of time including time interval 1, time interval 2 and time interval 3. In scenario 300, upon determining that entering the power-save mode is desirable (e.g., there is no outgoing data waiting in a queue), AP 110 may perform operations in accordance with the proposed scheme of the present disclosure.

Referring to FIG. 3, during time interval 1, AP 110 transmits (e.g., broadcast) a first DTIM beacon followed by a power-save request (labeled as "Request" in FIG. 3). Upon receiving the power-save request, each of STAs 120(1), 120(3) and 120(N-1) transmits an acknowledgment (labeled as "Ack" in FIG. 3). In response to receiving the acknowledgment from each of the active stations, AP 110 enters the power-save mode. At the beginning of time interval 2, AP 110 exits the power-save mode and transmits a second DTIM beacon followed by a power-save request. Upon receiving the power-save request, each of STAs 120(1) and 120(3) and 120(N-1) transmits an acknowledgment. However, as STA 120(N-1) has some outgoing data frames destined for AP 110, STA 120(N-1) first transmits the outgoing data frames and then transmits the acknowledgment. In some implementations, the acknowledgment from STA 120(N-1) may be the last outgoing data frame with the PS bit set to binary 1. Alternatively, the acknowledgment from STA 120(N-1) may be a null frame following the outgoing data frames. In response to receiving the acknowledgment from each of the active stations, AP 110 enters the power-save mode. At the beginning of time interval 3, AP 110 exits the power-save mode and transmits a third DTIM beacon followed by a power-save request. Upon receiving the power-save request, each of STAs 120(1), 120(3) and 120(N-1) transmits an acknowledgment. In response to receiving the acknowledgment from each of the active stations, AP 110 enters the power-save mode.

It is noteworthy that in scenario 300 it is desired that AP 110 enters the power-save mode whenever possible. Thus, during each of time intervals 1, 2 and 3, AP 110 transmits a power-save request after the DTIM beacon. In cases in which it is determined that AP 110 is not to enter the power-save mode (e.g., there is a queue of outgoing data destined for one or more of STAs 120(1)-120(N)), AP 110 would not transmit the power-save request after transmitting the DTIM beacon in a given time interval.

Illustrative Implementations

Figure 4:
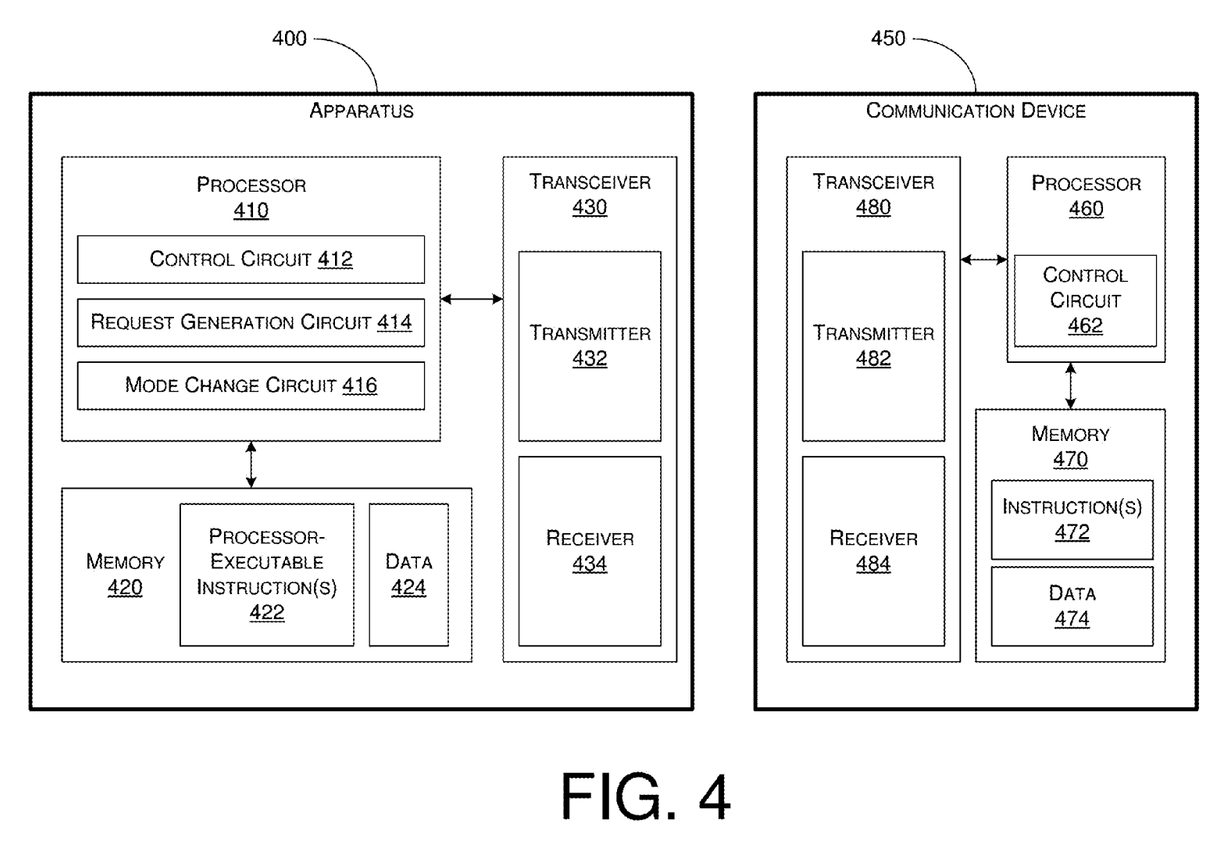
FIG. 4 is a block diagram of an example apparatus and an example communication device in accordance with an implementation of the present disclosure.

FIG. 4 illustrates an example apparatus 400 and an example communication device 450 in accordance with an implementation of the present disclosure. Apparatus 400 may perform various functions as an access point, software-enabled access point or virtual router to implement schemes, techniques, processes and methods described herein pertaining to power-save operations for access points, including scenario 100, logic flow 200 and scenario 300 described above as well as process 500 and process 600 described below. Apparatus 450 may perform various functions as a station or client device to implement schemes, techniques, processes and methods described herein pertaining to power-save operations for access points, including scenario 100, logic flow 200 and scenario 300 described above as well as process 500 and process 600 described below.

Each of apparatus 400 and apparatus 450 may be a part of an electronic apparatus which may be a communication device, a computing apparatus, a portable or mobile apparatus, or a wearable apparatus. For instance, apparatus 400 may be implemented in a repeater, a Wi-Fi access point, a smartphone, a smartwatch, a smart bracelet, a smart necklace, a personal digital assistant, or a computing device such as a tablet computer, a laptop computer, a notebook computer, a desktop computer, or a server. Likewise, apparatus 450 may be implemented in a Wi-Fi mobile client or station, a smartphone, a smartwatch, a smart bracelet, a smart necklace, a personal digital assistant, or a computing device such as a tablet computer, a laptop computer, a notebook computer, a desktop computer, or a server. Alternatively, each of apparatus 400 and apparatus 450 may be implemented in the form of one or more integrated-circuit (IC) chips such as, for example and not limited to, one or more single-core processors, one or more multi-core processors, or one or more complex-instruction-set-computing (CISC) processors.

Each of apparatus 400 and apparatus 450 may include at least some of those components shown in FIG. 4, respectively. For instance, apparatus 400 may include at least a processor 410, and apparatus 450 may include at least a processor 460. Additionally, apparatus 400 may include a memory 420 and/or a transceiver 430 configured to transmit and receive data wirelessly (e.g., in compliance with the IEEE 802.11 specification and/or any applicable wireless protocols and standards). Each of memory 420 and transceiver 430 may be communicatively and operably coupled to processor 410. Similarly, apparatus 450 may also include a memory 470 and/or a transceiver 480 configured to transmit and receive data wirelessly (e.g., in compliance with the IEEE 802.11 specification and/or any applicable wireless protocols and standards). Each of memory 470 and transceiver 480 may be communicatively and operably coupled to processor 460. Each of apparatus 400 and apparatus 450 may further include other components (e.g., power system, display device and user interface device), which are not pertinent to the proposed scheme of the present disclosure and, thus, are neither shown in FIG. 4 nor described herein in the interest of simplicity and brevity.

Transceiver 430 may be configured to communicate wirelessly in a single frequency band or multiple frequency bands (e.g., 2.4 GHz and/or 5 GHz). Transceiver 430 may include a transmitter 432 capable of transmitting data wirelessly and a receiver 434 capable of receiving data wirelessly. Likewise, transceiver 480 may be configured to communicate wirelessly in a single frequency band or multiple frequency bands (e.g., 2.4 GHz and/or 5 GHz). Transceiver 480 may include a transmitter 482 capable of transmitting data wirelessly and a receiver 484 capable of receiving data wirelessly.

Each of memory 420 and memory 470 may be a storage device configured to store one or more sets of codes, programs and/or instructions and/or data therein. In the example shown in FIG. 4, memory 420 stores one or more sets of processor-executable instructions 422 and data 424 therein, and memory 470 stores one or more sets of processor-executable instructions 472 and data 474 therein. Each of memory 420 and memory 470 may be implemented by any suitable technology and may include volatile memory and/or non-volatile memory. For example, each of memory 420 and memory 470 may include a type of random access memory (RAM) such as dynamic RAM (DRAM), static RAM (SRAM), thyristor RAM (T-RAM) and/or zero-capacitor RAM (Z-RAM). Alternatively or additionally, each of memory 420 and memory 470 may include a type of read-only memory (ROM) such as mask ROM, programmable ROM (PROM), erasable programmable ROM (EPROM) and/or electrically erasable programmable ROM (EEPROM). Alternatively or additionally, each of memory 420 and memory 470 may include a type of non-volatile random-access memory (NVRAM) such as flash memory, solid-state memory, ferroelectric RAM (FeRAM), magnetoresistive RAM (MRAM) and/or phase-change memory.

In one aspect, each of processor 410 and processor 460 may be implemented in the form of one or more single-core processors, one or more multi-core processors, or one or more CISC processors. That is, even though a singular term "a processor" is used herein to refer to each of processor 410 and processor 460, each of processor 410 and processor 460 may include multiple processors in some implementations and a single processor in other implementations in accordance with the present disclosure. In another aspect, each of processor 410 and processor 460 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 410 and processor 460 is a special-purpose machine specifically designed, arranged and configured to perform specific tasks including power-save operations for access points in accordance with various implementations of the present disclosure.

Processor 410, as a special-purpose machine, may include non-generic and specially-designed hardware circuits that are designed, arranged and configured to perform specific tasks pertaining to power-save operations for access points in accordance with various implementations of the present disclosure. In one aspect, processor 410 may execute the one or more sets of codes, programs and/or instructions 422 stored in memory 420 to perform various operations to render power-save operations in accordance with various implementations of the present disclosure. In another aspect, processor 410 may include a control circuit 412, a request generation circuit 414 and a mode change circuit 416 that, together, perform specific tasks and functions to render power-save operations for access points in accordance with various implementations of the present disclosure.

Processor 460, as a special-purpose machine, may include non-generic and specially-designed hardware circuits that are designed, arranged and configured to perform specific tasks pertaining to power-save operations for access points in accordance with various implementations of the present disclosure. In one aspect, processor 460 may execute the one or more sets of codes, programs and/or instructions 472 stored in memory 470 to perform various operations to render power-save operations in accordance with various implementations of the present disclosure. In another aspect, processor 460 may include a control circuit 462 that performs specific tasks and functions to render power-save operations for access points in accordance with various implementations of the present disclosure.

The following description is applicable to implementations in which apparatus 400 functions as an access point (e.g., AP 110).

In some implementations, request generation circuit 414 of processor 410 may generate a power-save request for transmission, via transmitter 432 of transceiver 430, to one or more communication devices (e.g., one or more of STAs 120(1)-120(N)). Control circuit 412 may receive, via receiver 434 of transceiver 430, an acknowledgment from each of the one or more communication devices. In response to receiving the acknowledgment from each of the one or more communication devices, mode change circuit 416 may cause apparatus 400 to enter a power-save mode. For instance, mode change circuit 416 may place one or more components of apparatus 400 in a sleep mode with the one or more components being inactive or otherwise deactivated. Alternatively or additionally, mode change circuit 416 may render one or more components of apparatus 400 to operate at a lower frequency and/or a lower voltage when apparatus 400 is in the power-save mode.

In some implementations, in generating the power-save request, request generation circuit 414 may set a power management-related bit in a frame control field of a MAC header of each of one or more data frames to a value (e.g., binary 1) to indicate an intent to enter the power-save mode.

In some implementations, in receiving the acknowledgment from each of the one or more communication devices, control circuit 412 may receive a null frame or a data frame from each of the one or more communication devices, with a power management-related bit in a frame control field of a MAC header of the null frame or the data frame is set to a value (e.g., binary 1) that indicates a positive acknowledgement of the power-save request.

In some implementations, in response to not receiving an acknowledgment from at least one of the one or more communication devices, control circuit 412 may delay apparatus 400 from entering the power-save mode until an acknowledgement is received from each of the one or more communication devices in response to a subsequent power-save request to be transmitted.

In some implementations, mode change circuit 416 may cause apparatus 400 to exit the power-save mode prior to transmission of a next DTI M beacon, which is consecutively subsequent a previous DTIM beacon transmitted before apparatus 400 enters the power-save mode.

In some implementations, control circuit 412 may identify the one or more communication devices as a subset of active communication devices of a plurality of communication devices (e.g., identifying STAs 120(1), 120(3) and 120(N−1) as the active stations among STAs 120(1)-120(N)). Each of the one or more communication devices may be actively engaged in communications with apparatus 400, and at least one other communication device of the plurality of communication device (e.g., STAs 120(2), 120(4) and 120(N)) may be not actively engaged in communications with apparatus 400.

In some implementations, control circuit 412 may transmit, via transmitter 432, a DTIM beacon to the one or more communication devices. Moreover, control circuit 412 may broadcast or multicast, via transmitter 432, the power-save request to the one or more communication devices after transmitting the DTIM beacon.

The following description is applicable to implementations in which apparatus 450 functions as a station (e.g., one of STAs 120(1), 120(3) and 120(N−1)).

In some implementations, control circuit 462 may receive, via receiver 484 of transceiver 480, a power-save request from an apparatus (e.g., apparatus 400). Additionally, control circuit 462 may transmit, via transmitter 482 of transceiver 480, an acknowledgment to the apparatus. Moreover, control circuit 462 may buffer one or more frames destined for the apparatus after the transmitting (e.g., by storing the one or more frames as data 474 in memory 470).

In some implementations, in receiving the power-save request, control circuit 462 may receive, via receiver 484, one or more data frames with a power management-related bit in a frame control field of a MAC header of each of the one or more data frames set to a value (e.g., binary 1) to indicate an intent of the apparatus to enter a power-save mode.

In some implementations, in transmitting the acknowledgment, control circuit 462 may set a power management-related bit in a frame control field of a MAC header of a null frame or a data frame to a value (e.g., binary 1) to indicate a positive acknowledgment of the power-save request. Moreover, control circuit 462 may transmit, via transmitter 482, the null frame or the data frame to the apparatus.

In some implementations, in buffering the one or more frames, control circuit 462 may buffer the one or more frames until a next DTIM beacon is received, with the next DTIM beacon being consecutively subsequent a previous DTIM beacon received prior to the buffering.

Figure 5:
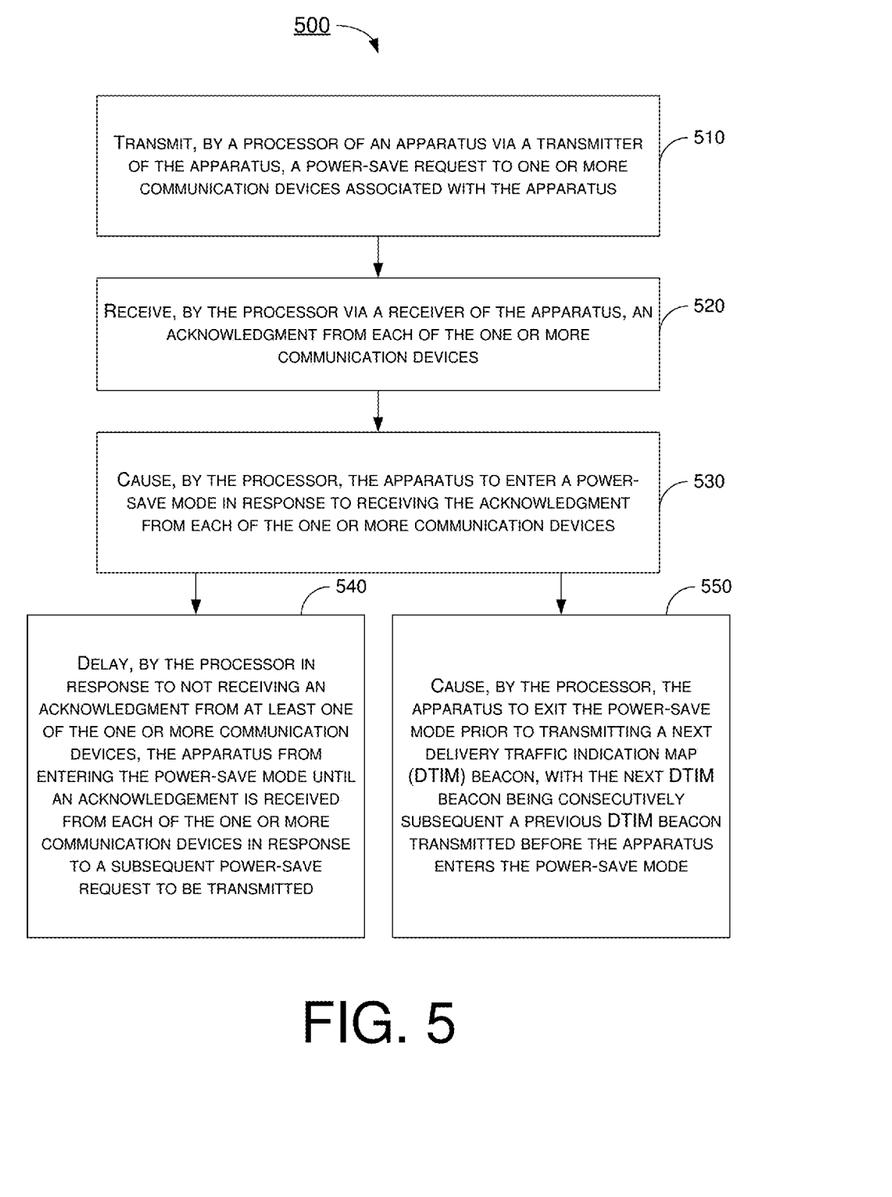
FIG. 5 is a flowchart of an example process in accordance with an implementation of the present disclosure.

FIG. 5 illustrates an example process 500 in accordance with an implementation of the present disclosure. Process 500 may represent an aspect of implementing features of apparatus 400. Process 500 may include one or more operations, actions, or functions as illustrated by one or more of blocks 510, 520, 530, 540 and 550. Although illustrated as discrete blocks, various blocks of process 500 may be divided into additional blocks, combined into fewer blocks, or eliminated, depending on the desired implementation. Moreover, the blocks/sub-blocks of process 500 may executed in the order shown in FIG. 5 or, alternatively in a different order. Process 500 may be implemented by apparatus 400 and any variations thereof, which may be may be an access point, a software-enabled access point, or a virtual router. For instance, process 500 may be implemented in or by apparatus 400 functioning as access point AP 110 in scenario 100 and/or scenario 300. Solely for illustrative purposes, process 500 is described below in the context of apparatus 400 being an access point. Process 600 may begin at block 510.

At 510, process 500 may involve processor 410 of apparatus 400 transmitting, via transmitter 432 of transceiver 430 of apparatus 400, a power-save request to one or more communication devices associated with apparatus 400 (e.g., STAs 120(1), 120(3) and 120(N−1)). For instance, process 500 may involve processor 410 broadcasting or multicasting, via transmitter 432, the power-save request. Process 500 may proceed from 510 to 520.

At 520, process 500 may involve processor 410 receiving, via receiver 434 of transceiver 430 of apparatus 400, an acknowledgment from each of the one or more communication devices. Process 500 may proceed from 520 to 530.

At 530, process 500 may involve processor 410 causing apparatus 400 to enter the power-save mode in response to receiving the acknowledgment from each of the one or more communication devices. Process 500 may proceed from 530 to 540 or 550.

At 540, in response to not receiving an acknowledgment from at least one of the one or more communication devices, process 500 may involve processor 410 delaying apparatus 400 from entering the power-save mode until an acknowledgement is received from each of the one or more communication devices in response to a subsequent power-save request to be transmitted.

At 550, process 500 may involve processor 410 causing apparatus 400 to exit the power-save mode prior to transmitting a next DTIM beacon, which is consecutively subsequent a previous DTIM beacon which was transmitted before apparatus 400 enters the power-save mode.

In some implementations, in transmitting the power-save request, process 500 may involve processor 410 to perform a number of acts. For instance, process 500 may involve processor 410 setting a power management-related bit (e.g., PS bit) in a frame control field of a MAC header of each of one or more data frames to a value (e.g., binary 1) to indicate an intent to enter the power-save mode. Moreover, process 500 may involve processor 410 transmitting, via transmitter 432, a DTIM beacon and the one or more data frames after transmitting the DTIM beacon.

In some implementations, in receiving the acknowledgment from each of the one or more communication devices, process 500 may involve processor 410 receiving, via receiver 434, a null frame or a data frame from each of the one or more communication devices, with a power management-related bit in a frame control field of a MAC header of the null frame or the data frame set to a value (e.g., binary 1) that indicates a positive acknowledgement of the power-save request.

In some implementations, process 500 may also involve processor 410 identifying the one or more communication devices as a subset of active communication devices of a plurality of communication devices (e.g., identifying STAs 120(1), 120(3) and 120(N−1) as a subset of active stations among the STAs 120(1)-120(N) of BSS 105). Each of the one or more communication devices may be actively engaged in communications with apparatus 400, and at least one other communication device (e.g., STAs 120(2), 120(4) and/or 120(N)) of the plurality of communication device may be not actively engaged in communications with apparatus 400.

Figure 6:
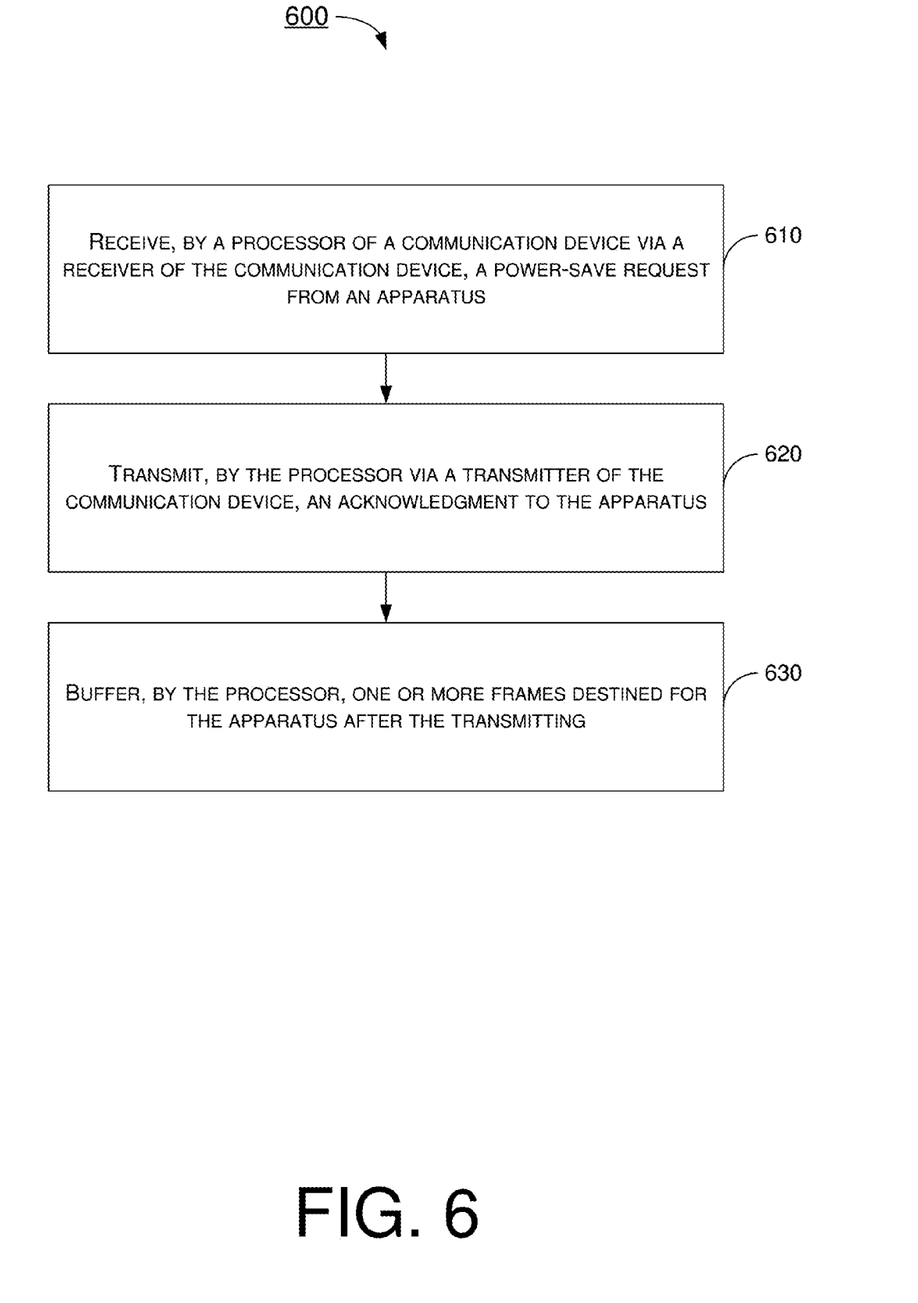
FIG. 6 is a flowchart of an example process in accordance with another implementation of the present disclosure.

FIG. 6 illustrates an example process 600 in accordance with another implementation of the present disclosure. Process 600 may represent an aspect of implementing features of communication device 450. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks/sub-blocks of process 600 may executed in the order shown in FIG. 6 or, alternatively in a different order. Process 600 may be implemented by communication device 450 and any variations thereof. For instance, process 600 may be implemented in or by communication device 450 functioning as any one of STAs 120(1), 120(3) and 120(N−1) in scenario 100 and/or scenario 300. Solely for illustrative purposes, process 600 is described below in the context of communication device 450 being a station. Process 600 may begin at block 610.

At 610, process 600 may involve processor 460 of communication device 450 receiving, via receiver 484 of transceiver 480 of communication device 450, a power-save request from an apparatus (e.g., AP 110 or apparatus 400). Process 600 may proceed from 610 to 620.

At 620, process 600 may involve processor 460 transmitting, via transmitter 482 of transceiver 480 of communication device 450, an acknowledgment to the apparatus. Process 600 may proceed from 620 to 630.

At 630, process 600 may involve processor 460 buffering one or more frames destined for the apparatus after the transmitting. For instance, processor 460 may buffer the one or more frames as data 424 in memory 470.

In some implementations, in receiving the power-save request, process 600 may involve processor 460 receiving, via receiver 484, one or more data frames with a power management-related bit in a frame control field of a MAC header of each of the one or more data frames set to a value (e.g., binary 1) to indicate an intent of the apparatus to enter a power-save mode.

In some implementations, in transmitting the acknowledgment, process 600 may involve processor 460 performing a number of acts. For instance, process 600 may involve processor 460 setting a power management-related bit in a frame control field of a MAC header of a null frame or a data frame to a value (e.g., binary 1) to indicate a positive acknowledgment of the power-save request. Moreover, process 600 may involve processor 460 transmitting, via transmitter 482, the null frame or the data frame to the apparatus.

In some implementations, in buffering the one or more frames, process 600 may involve processor 460 buffering the one or more frames until a next DTIM beacon is received. The next DTIM beacon may be consecutively subsequent a previous DTIM beacon which is received prior to the buffering.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    transmitting, by a processor of an apparatus via a transmitter of the apparatus, a power-save request to one or more communication devices associated with the apparatus;
    receiving, by the processor via a receiver of the apparatus, an acknowledgment from each of the one or more communication devices; and
    responsive to receiving the acknowledgment from each of the one or more communication devices, causing, by the processor, the apparatus to enter a power-save mode,
    wherein the transmitting of the power-save request comprises:
        setting a power management-related bit in a frame control field of a media access control (MAC) header of each of one or more data frames to a value to indicate an intent to enter the power-save mode;
        transmitting a delivery traffic indication map (DTIM) beacon; and
        transmitting the one or more data frames after transmitting the DTIM beacon.

2. The method of claim 1, wherein the transmitting of the power-save request comprises broadcasting or multicasting the power-save request.

3. The method of claim 1, wherein the receiving of the acknowledgment from each of the one or more communication devices comprises receiving a null frame or a data frame from each of the one or more communication devices, and wherein a power management-related bit in a frame control field of a media access control (MAC) header of the null frame or the data frame is set to a value that indicates a positive acknowledgement of the power-save request.

4. The method of claim 1, wherein the apparatus comprises an access point, a software-enabled access point, or a virtual router.

5. The method of claim 1, further comprising:
    responsive to not receiving an acknowledgment from at least one of the one or more communication devices, delaying, by the processor, the apparatus from entering the power-save mode until an acknowledgement is received from each of the one or more communication devices in response to a subsequent power-save request to be transmitted.

6. The method of claim 1, further comprising:
    causing, by the processor, the apparatus to exit the power-save mode prior to transmitting a next delivery traffic indication map (DTIM) beacon, and wherein the next DTIM beacon is consecutively subsequent a previous DTIM beacon transmitted before the apparatus enters the power-save mode.

7. The method of claim 1, further comprising:
    identifying, by the processor, the one or more communication devices as a subset of active communication devices of a plurality of communication devices,
    wherein each of the one or more communication devices is actively engaged in communications with the apparatus, and
    wherein at least one other communication device of the plurality of communication device is not actively engaged in communications with the apparatus.

8. A method, comprising:
    receiving, by a processor of a communication device via a receiver of the communication device, a power-save request from an apparatus;

transmitting, by the processor via a transmitter of the communication device, an acknowledgment to the apparatus; and buffering, by the processor, one or more frames destined for the apparatus after the transmitting, wherein the receiving of the power-save request comprises receiving one or more data frames with a power management-related bit in a frame control field of a media access control (MAC) header of each of the one or more data frames set to a value to indicate an intent of the apparatus to enter a power-save mode.

9. The method of claim 8, wherein the transmitting of the acknowledgment comprises:

setting a power management-related bit in a frame control field of a media access control (MAC) header of a null frame or a data frame to a value to indicate a positive acknowledgment of the power-save request; and transmitting the null frame or the data frame to the apparatus.

10. The method of claim 8, wherein the buffering of the one or more frames comprises buffering the one or more frames until a next delivery traffic indication map (DTIM) beacon is received, and wherein the next DTIM beacon is consecutively subsequent a previous DTIM beacon which is received prior to the buffering.

11. An apparatus, comprising:

a memory that stores one or more sets of instructions; and a processor communicatively coupled to the memory to execute the one or more sets of instructions such that, upon execution of the one or more sets of instructions, the processor performs acts comprising:

generating a power-save request for transmission to one or more communication devices;

receiving an acknowledgment from each of the one or more communication devices; and responsive to receiving the acknowledgment from each of the one or more communication devices, causing the apparatus to enter a power-save mode, wherein, in generating the power-save request, the processor sets a power management-related bit in a frame control field of a media access control (MAC) header of each of one or more data frames to a value to indicate an intent to enter the power-save mode.

12. The apparatus of claim 11, wherein, in receiving the acknowledgment from each of the one or more communication devices, the processor receives a null frame or a data frame from each of the one or more communication devices, and wherein a power management-related bit in a frame control field of a media access control (MAC) header of the null frame or the data frame is set to a value that indicates a positive acknowledgement of the power-save request.

13. The apparatus of claim 11, wherein, upon execution of the one or more sets of instructions, the processor further performs acts comprising:

responsive to not receiving an acknowledgment from at least one of the one or more communication devices, delaying the apparatus from entering the power-save mode until an acknowledgement is received from each of the one or more communication devices in response to a subsequent power-save request to be transmitted.

14. The apparatus of claim 11, wherein, upon execution of the one or more sets of instructions, the processor further performs acts comprising:

causing the apparatus to exit the power-save mode prior to transmission of a next delivery traffic indication map (DTIM) beacon, and wherein the next DTIM beacon is consecutively subsequent a previous DTIM beacon transmitted before the apparatus enters the power-save mode.

15. The apparatus of claim 11, wherein, upon execution of the one or more sets of instructions, the processor further performs acts comprising:

identifying the one or more communication devices as a subset of active communication devices of a plurality of communication devices, wherein each of the one or more communication devices is actively engaged in communications with the apparatus, and wherein at least one other communication device of the plurality of communication device is not actively engaged in communications with the apparatus.

16. The apparatus of claim 11, further comprising:

a transmitter that transmits the power-save request to the one or more communication devices; and a receiver that receives the acknowledgment from each of the one or more communication devices.

17. The apparatus of claim 16, wherein, upon execution of the one or more sets of instructions, the processor further performs acts comprising:

transmitting, via the transmitter, a delivery traffic indication map (DTIM) beacon to the one or more communication devices; and transmitting, via the transmitter, the power-save request to the one or more communication devices after transmitting the DTIM beacon, wherein the transmitting comprises broadcasting or multicasting.

* * * * *